(12) United States Patent
Povolny et al.

(10) Patent No.: US 9,408,020 B2
(45) Date of Patent: Aug. 2, 2016

(54) METHOD AND RADIO BEACON FOR LOCALISING AN ON-BOARD UNIT

(71) Applicant: Kapsch TrafficCom AG, Vienna (AT)

(72) Inventors: Robert Povolny, Vienna (AT); Josef Winkler, Baden (AT); Martin Frischherz, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 0 days.

(21) Appl. No.: 14/463,407

(22) Filed: Aug. 19, 2014

(65) Prior Publication Data

US 2015/0056922 A1  Feb. 26, 2015

(30) Foreign Application Priority Data

Aug. 23, 2013  (EP) ..................... 13181570

(51) Int. Cl.
| | |
|---|---|
| H04W 4/14 | (2009.01) |
| H04W 4/00 | (2009.01) |
| H04B 1/3822 | (2015.01) |
| H04W 52/04 | (2009.01) |
| H04W 88/08 | (2009.01) |
| G07B 15/06 | (2011.01) |

(52) U.S. Cl.
CPC ............ H04W 4/008 (2013.01); G07B 15/063 (2013.01); H04B 1/3822 (2013.01); H04W 52/04 (2013.01); H04W 88/08 (2013.01)

(58) Field of Classification Search
None
See application file for complete search history.

(56) References Cited

U.S. PATENT DOCUMENTS

| 7,385,525 B2 | 6/2008 | Ho et al. | |
|---|---|---|---|
| 2010/0237998 A1* | 9/2010 | Kohli | G07B 15/063 340/10.1 |

FOREIGN PATENT DOCUMENTS

| EP | 2363826 A2 | 9/2011 |
|---|---|---|
| WO | 2010/105349 A1 | 9/2010 |

OTHER PUBLICATIONS

European Search Report Received for EP Patent Application No. 13181570.6, mailed on Jan. 27, 2014, 7 pages.
Office Action received for Mexican Patent Application No. MX/a/2014/010124, mailed on Jan. 21, 2016, 5 pages (2 pages of English Translation and 3 pages of Official copy).
Office Action received for European Patent Application No. 13181570.6, mailed on Jun. 5, 2015, 4 pages (Official Copy Only).

* cited by examiner

*Primary Examiner* — Philip Sobutka

(57) ABSTRACT

A method for localizing an on-board unit, which has a radio transceiver and an identifier, to a predefined area around a radio beacon, comprising the following steps: a) storing the identifier and an associated radio property in a database; b) sending a first request; c) receiving a first response from an on-board unit; d) determining, from the database, the radio property of the transceiver associated with the received identifier; and e) localizing the on-board unit in the predefined area; wherein: the steps b) to e) are repeated, for each run-through of the steps b) to e), a localization result is stored in a presence list, and the localizing is verified when the number of the positive localization results exceeds a threshold value.

12 Claims, 6 Drawing Sheets

| PRL | | |
|---|---|---|
| TID | TP | locRes |
| $TID_1$ | $TP_1$ | $\{locRes_{1,1}, locRes_{1,2}, ..., locRes_{1,n}, ..., locRes_{1,N}\}$ |
| $TID_2$ | $TP_2$ | $\{locRes_{2,1}, locRes_{2,2}, ..., locRes_{2,n}, ..., locRes_{2,N}\}$ |
| ⋮ | ⋮ | ⋮ |
| $TID_i$ | $TP_i$ | $\{locRes_{i,1}, locRes_{i,2}, ..., locRes_{i,n}, ..., locRes_{i,N}\}$ |
| ⋮ | ⋮ | ⋮ |
| $TID_I$ | $TP_I$ | $\{locRes_{I,1}, locRes_{I,2}, ..., locRes_{I,n}, ..., locRes_{I,N}\}$ |

*Fig. 4a*

| PRL | | | |
|---|---|---|---|
| TID | TP | RSSI | locRes |
| $TID_1$ | $TP_1$ | $RSSI_1$ | $locRes_1$ |
| $TID_2$ | $TP_2$ | $RSSI_2$ | $locRes_2$ |
| ⋮ | ⋮ | ⋮ | ⋮ |
| $TID_i$ | $TP_i$ | $RSSI_i$ | $locRes_i$ |
| ⋮ | ⋮ | ⋮ | ⋮ |
| $TID_I$ | $TP_I$ | $RSSI_I$ | $locRes_I$ |

*Fig. 4b*

METHOD AND RADIO BEACON FOR LOCALISING AN ON-BOARD UNIT

CROSS-REFERENCE TO RELATED APPLICATION(S)

This application claims priority to European Patent Application No. 13 181 570.6, filed on Aug. 23, 2013, the entirety of which is incorporated by reference herein.

BACKGROUND

1. Technical Field

The present subject matter relates to a method for localising an on-board unit to an area around a radio beacon. The present subject matter also relates to a radio beacon for such a method.

2. Background Art

In modern road toll systems, vehicles are equipped with on-board units (OBUs), with the aid of which the vehicles are located and their road use can then be evaluated and/or billed. To this end, a plurality of radio beacons are distributed over the road network, each having a limited radio coverage area, in which they can communicate with the OBUs of passing vehicles via radio, wherein a successful radio communication locates the OBU to the radio coverage area. The communication of the OBU with the radio beacon can here be based on DSRC (dedicated short range communication), WAVE (wireless access for vehicular environment), RFID (radio-frequency identification) or similar technologies, and the OBUs may accordingly be of the active or passive (transponder) type.

When a road has a number of lanes and an assignment of a passing vehicle to a lane is necessary, each lane is generally assigned a dedicated radio beacon. The radio coverage area (the communication zone) of the respective radio beacon must be limited here to the lane as best as possible by adapting the transmission strength of the radio beacon to the reception sensitivity of the OBU (and vice versa) in order to avoid the addressing or the detection of vehicle OBUs in adjacent lanes (what is known as "cross-talk"). This problem is particularly significant with roads having individual lanes (single lanes), since an addressing of a vehicle in a lane such as a lane travelling in the opposite direction would disrupt the operation, or with multi-lane roads, in which case the lane assignment is important, for example in the case of HOV (high occupancy vehicle) lanes.

This problem is aggravated by the fact that increasingly greater sensitivities and transmission strengths on the part of the OBUs can be achieved due to the continued technical development of the transceiver or transponder modules, whether active or passive, used in the OBUs, for example passive ISO-18000-63 chips. In addition, it is increasingly required for the described toll systems to be extendable to a number of countries and for OBUs of various national operators to be usable interoperably in these systems. A large number of models of OBUs with a wide range of different reception sensitivities and transmission strengths can thus be used in a road network, which leads to increased cross-talk.

WO 2010/105349 A1 shows a communication system between an antenna and an OBU. The OBU sends a message indicating its OBU type to the antenna, whereupon the antenna can localise the OBU by means of the received OBU type and a measured received signal strength of the message.

EP 2363826 A2 shows the localisation of RFID Tags from which an identifier is read out too. The localisation of the RFID Tags is carried out by reading out a parameter corresponding to the identifier.

U.S. Pat. No. 7,385,525 B2 shows a method for localising a vehicle on a lane by means of handshakes between an antenna and an OBU of the vehicle.

BRIEF SUMMARY

The object of the present subject matter is to solve these problems and to create a method and a radio beacon that enable reliable localisation of an OBU to a predefined area, for example a specific lane of a road, around the radio beacon.

The object is achieved in accordance with a first aspect with a method for localising an on-board unit, which has a radio transceiver and an identifier, to a predefined area around a radio beacon, comprising the following steps:

a) storing the identifier of the on-board unit and an associated radio property of the radio transceiver thereof in a database, b) sending a first request with a first transmission power from the radio beacon, c) receiving, in the radio beacon, a first response, which contains the identifier, from an on-board unit, d) determining from the database the radio property of the transceiver of the on-board unit associated with the received identifier, and e) localising the on-board unit in the predefined area with use of the determined radio property.

In accordance with an aspect, individual radio properties specific for each OBU are thus taken into consideration for the localisation process and are prestored in a database. If the identifier does not identify an individual OBU (which is possible), but merely the type thereof, generalised radio properties can be prestored in the database for a specific OBU type and can be used for the localisation. If, by way of example, a new type of OBU were to come onto the market and be used in the road toll system, it is sufficient to store a corresponding type identifier and specific radio property/properties thereof in the database. There is thus nothing to prevent an extension of a road system to all types of OBUs and radio transceiver or transponder chips thereof, provided they are known to the database. The method can be applied very easily to existing devices for localising an OBU, for example in road traffic, by connecting these devices to a corresponding database and adapting the radio coverage areas of the radio beacons to the transmitted OBU-specific radio properties.

As the first response contains a unique OBU identifier and as the OBU identifier is stored in a presence list while receiving the first response, a vehicle can be identified uniquely on the basis of its OBU identifier, and the presence of said vehicle in the radio coverage area of the radio beacon can be stored at least temporarily. With this information the localisation accuracy can be increased by repeating steps b) to e) for at least one further cycle following a first cycle, by storing, for each cycle of steps b) to e) concerning a respective OBU identifier, a localisation result in the presence list for the respective OBU identifier, and verifying the localisation of the on-board unit of the respective OBU identifier if the number of positive localisation results stored for the respective OBU identifier exceeds a threshold value. It should be mentioned that this number can be defined in absolute or relative terms, for example based on the totality of localisation results of an on-board unit, and that the threshold value may be constant or dynamically adapted.

In accordance with a first embodiment, the localisation of step e) comprises calculating a second transmission power in accordance with the determined radio property and the predefined area, sending a second request with the calculated second transmission power from the radio beacon, and, when a second response to the second request is received from the same on-board unit, localising this on-board unit as being present in the predefined area. In this embodiment, the transmission power of the radio beacon is thus adapted specifically to the current OBU, or type thereof when the read OBU identifier specifies the OBU type. A transmission power that is excessive for a specific OBU type and that could lead to an undesirable response of OBUs in adjacent lanes, or an insufficient power, which could lead to an erroneous detection, is thus avoided. Since, in this embodiment, the strength of the first response of the on-board unit does not also have to be measured, costs incurred at any rate for measurement apparatuses and calibrations can be saved.

In the embodiment just mentioned, the radio property considered may, for example, be a reception sensitivity of the radio transceiver of the on-board unit. This has the advantage that the transmission strength of the second request can be calculated directly from the sensitivity and a radius for the area in which the OBU is to localised.

In accordance with an alternative second embodiment, the localisation of step e) comprises calculating a threshold value for the received signal strength in accordance with the determined radio property, the first transmission power and the predefined area, comparing the measured received signal strength of the first response with the calculated threshold value, and, if the threshold value is exceeded, localising the on-board unit as being located in the predefined area. Since, here, the radio transceiver of the radio beacon has to measure only the received signal strength of the first response and can thus localise the on-board unit without sending a second request or without receiving a second response of the on-board unit, first requests can be sent quickly in succession, without overloading the radio channel between the OBU and radio beacon.

In the aforementioned second embodiment, the radio property considered may, for example, be a measure for the conversion gain of the radio transceiver of the on-board unit. The distance of the radio beacon from the on-board unit that has responded to the request can thus be determined particularly easily on the basis of the known transmission power of the radio beacon.

In a variant of all aforementioned embodiments, in order to facilitate the determination of the radio property associated with the received identifier, said identifier, as already indicated, is merely a type identifier of the radio transceiver, that is to say is not a unique identifier for any individual OBU, but is only an identifier identifying the type (the class) of the OBU. A direct association of OBU type to radio property is thus possible, and the database can be kept as compact as possible, since the necessary memory space, compared with a possible direct assignment between individual OBU identifiers and radio properties, reduces significantly.

In order to localise a plurality of vehicles when a plurality of first responses to a first request are received, all OBU identifiers contained in these responses are stored in the presence list and steps d) and e) are performed for each unique OBU identifier stored in the presence list.

In accordance with a further embodiment, in the case that a number of vehicles are present and when the localisation is performed by means of a second request, each of the second requests is addressed to one of the OBU identifiers stored in the presence list. This leads to a time saving, since all second responses are received and are only then assigned to an OBU identifier if the addressing has not already taken place in the second request.

In a second aspect, a radio beacon is created for localising an on-board unit, which has a radio transceiver and an identifier, to a predefined area around the radio beacon, the radio beacon comprising:
  a memory;
  a radio transceiver; and
  a processor connected to the memory and to the radio transceiver;
  wherein the processor is configured
  a) to store the identifier of the on-board unit and an associated radio property of the radio transceiver in the memory,
  b) to send a first request with a first transmission power via the radio transceiver,
  c) to receive, from an on-board unit, a first response, which contains the identifier and a unique OBU identifier, via the radio transceiver, and to store the OBU identifier in the presence list,
  d) to determine, from the memory, the radio property of the transceiver of the on-board unit associated with the received identifier, and
  e) to localise the on-board unit in the predefined area by using the determined radio property, and
  wherein the processor is further configured to
  repeat the steps b) to e) for at least one further run-through following a first run-through,
  to store a localisation result in the presence list for a respective OBU identifier for each run-through of the steps b) to e) concerning the respective OBU identifier, and
  to verify the localising of the on-board unit of the respective OBU identifier when the number of positive localisation results stored for the respective OBU identifier exceeds a threshold value.

In accordance with a first embodiment, the radio beacon is characterised in that
  said radio property is a measure for the reception sensitivity of the radio transceiver of the on-board unit, and
  in that the processor is configured, in the case of said localisation,
    to calculate a second transmission power in accordance with the determined radio property and the predefined area,
    to send a second request with the calculated second transmission power via the radio transceiver, and,
    when a second response to the second request is received from the same on-board unit, to localise this on-board unit as being located in the predefined area.

In a second embodiment, the radio beacon is characterised in that
  said radio property is a measure for the conversion gain of the radio transceiver of the on-board unit, and
  in that the processor is configured, in the case of said localisation,
    to calculate a threshold value for the received signal strength in accordance with the determined radio property, the first transmission power and the predefined area,
    to compare the measured received signal strength of the first response with the calculated threshold value, and,
    if the threshold value is exceeded, to localise the on-board unit as being located in the predefined area.

With respect to the advantages and further embodiments of the radio beacon according to the subject matter disclosed herein, reference is made to the previous embodiments of the method.

BRIEF DESCRIPTION OF THE DRAWINGS/FIGURES

The invention will be explained in greater detail hereinafter on the basis of exemplary embodiments illustrated in the accompanying drawings, in which:

FIGS. 3a and 3b show two different embodiments of a database with OBU identifiers and associated radio properties.

FIGS. 4a and 4b show different embodiments of a presence list managed in a radio beacon.

DETAILED DESCRIPTION

Figure 1:
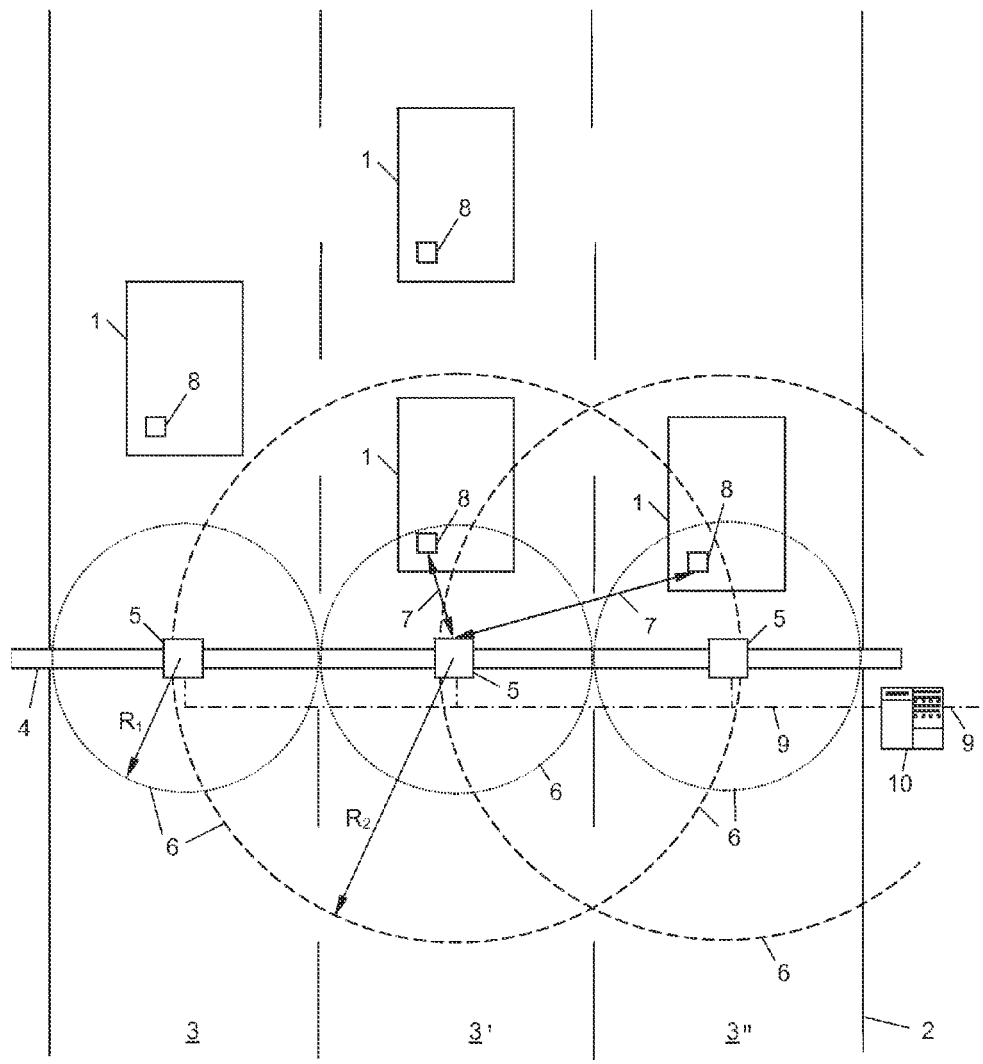
FIG. 1 shows a schematic plan view of a road having a number of lanes and radio beacons thereof.

In accordance with FIG. 1, a number of vehicles 1 are located on a road 2 having different lanes 3, 3', 3". A gantry 4 spans the road 2 and carries a number of radio beacons 5, which are each assigned to a lane 3, 3', 3" so as to be able to localise (locate) passing vehicles to (in) this lane. The localisation can be used for example in order to levy a toll dependent on direction of travel, for example in the case of single lanes with different directions of travel, or for levying a toll dependent on lane, for example in the case of HOV (high occupancy vehicle) lanes, HOT (high occupancy toll) lanes or the like.

For this purpose, each radio beacon 5 may perform, in its radio coverage area 6, radio communications with on-board units (OBUs) 8, which are each carried by a vehicle 1. As shown by the different radii $R_1$ and $R_2$, the size of the radio coverage area 6 of each radio beacon 5 can be adjusted, for example by adjusting the transmission power (transmission strength) and/or reception sensitivity of said radio beacon, as will be explained later in greater detail, for example so as to adapt the radio coverage area 6 precisely to the lane 3, 3', 3" to which the respective radio beacon 5 is assigned. In the case adapted optimally to the lane width and OBU (here: $R_1$), a successful radio communication 7 between radio beacon 5 and OBU 8 indicates that the OBU 8 is present in this lane 3, 3', 3", that is to say the OBU 8 (and therefore the vehicle 1) is/are localised. In the case of a mismatch, when the transmission power and/or reception sensitivity of a radio beacon 5 is too high, radio communications 7 can occur mistakenly with OBUs 8 in adjacent lanes ("cross-talk"), as is shown in the case of the right-hand radio communication 7, which lead to an incorrect localisation result, or, when the transmission power and/or reception sensitivity of the radio beacon 5 is/are too low, OBUs 8 or vehicles 1 travelling in the correct assigned lane 3, 3', 3" may in some circumstances not even be recognised and localised. The measures and methods presented hereinafter serve to prevent this situation.

The radio beacons 5, OBUs 8 and radio communications 7 therebetween can be configured in accordance with any radio standard known in the art, for example DSRC (dedicated short range communication, in particular CEN-DSRC), WAVE (wireless access for vehicular environment), WLAN (wireless local area network, in particular IEEE 802.11p, ITS-G5 and standards compatible therewith), RFID (radio-frequency identification, in particular ISO-18000-63 and standards compatible therewith), WiFi®, Bluetooth® or the like. Here, the OBUs may be both of the "active" type, that is to say with independent energy supply, and of the "passive" type, that is to say in the form of transponder chips, for example, RFID chips ("tags"), which draw their energy from the radio field of a radio beacon 5 addressing them (the radio beacon then being embodied for example in the form of an RFID reader).

Any successful radio communication 7 generally comprises one or more exchanges (transfers) of data packets via the radio interface in the form of a request and associated response. The radio communications 7, besides said localisation, may also be used here for various other (primary) purposes, for example for the identification of passing OBUs 8, the billing of toll fees or road use fees, the supply of information, etc. to the OBUs 8 or vehicles 1, wherein these functions will not be considered further for the localisation described here. The radio beacons 5 can be connected for all these purposes via a data connection 9 to a local computer 10 and/or central unit (not illustrated).

Of course, any number of lanes 3, 3', 3" can be used, the radio beacons 5 do not have to be arranged directly above the respective lane 2, and the radio coverage areas 6 may also have a shape different from the illustrated circular shape, for example may be club-shaped, asymmetrical, or the like.

Figure 2:
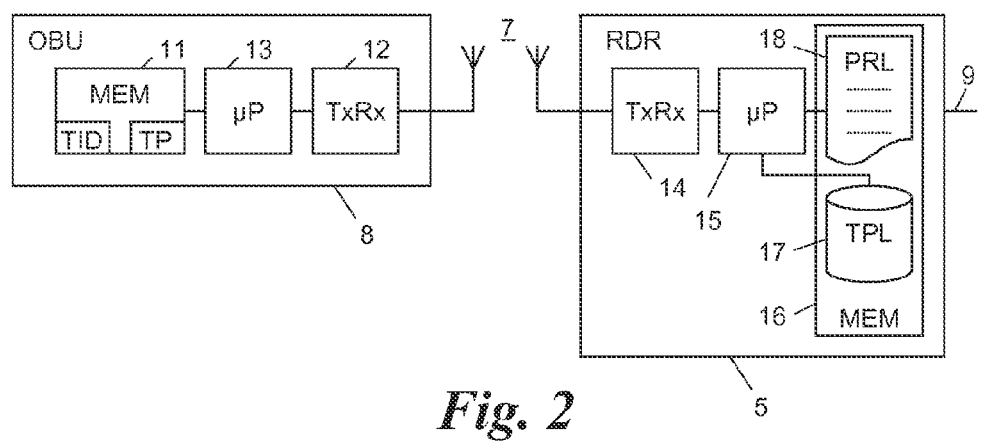
FIG. 2 shows an on-board unit and a radio beacon according to an embodiment inclusive of the components thereof in the form of a block diagram.

In accordance with FIG. 2, each on-board unit 8 has a memory 11 and a radio transceiver 12 which are connected via a processor 13. The memory 11 contains at least one unique identifier, TID of the OBU 8 ("Tag-ID" or "OBU identifier") and an identifier TP ("type identifier") indicating the type of the OBU 8 or radio transceiver 12 thereof. The type identifier TP may also be part of the OBU identifier TID, that is to say a subregion of the OBU identifier TID may specify the OBU type TP, as defined for example in standard ISO-18000-63.

To perform the radio communication 7 with passing OBUs 8, each radio beacon 5 comprises at least one radio transceiver 14, which can communicate with the radio transceiver 12 of an OBU 8, and a connected processor 15. The processor 15 is connected to a memory 16, which contains a database 17 containing a list TPL of possible type identifiers TP ("type list") of OBUs 8. The memory 16 may optionally have a memory region 18 containing a list PRL ("presence list") of the OBUs 8 currently present in the radio coverage area 6 of the radio beacon 5, the purpose of which will be explained further below. The database 17 containing the type list TPL and the region 18 containing the presence list PRL can also be arranged in separate memories, for example via the data connection 9 in the local computer 10 and/or a remote central unit (not shown).

The method performed by a radio beacon 5 to localise an OBU 8 to a lane 3, 3', 3" will now be explained in greater detail with reference to FIGS. 3 to 6, wherein FIGS. 3a, 4a, 5a and 6a show a first embodiment and FIGS. 3b, 4b, 5b and 6b show a second embodiment of the method, which can also be combined arbitrarily. Various OBUs 8, which are located in the radio coverage area 6 of a radio beacon 5, are distinguished here by the index i=1 . . . I, see the presence list PRL of FIGS. 4a and 4b, and different types TP of OBUs 8, which may appear within the scope of the system considered here (FIG. 1), will be distinguished hereinafter by the index k=1 . . . K, see the type list TPL of FIGS. 3a and 3b.

Figure 5A:
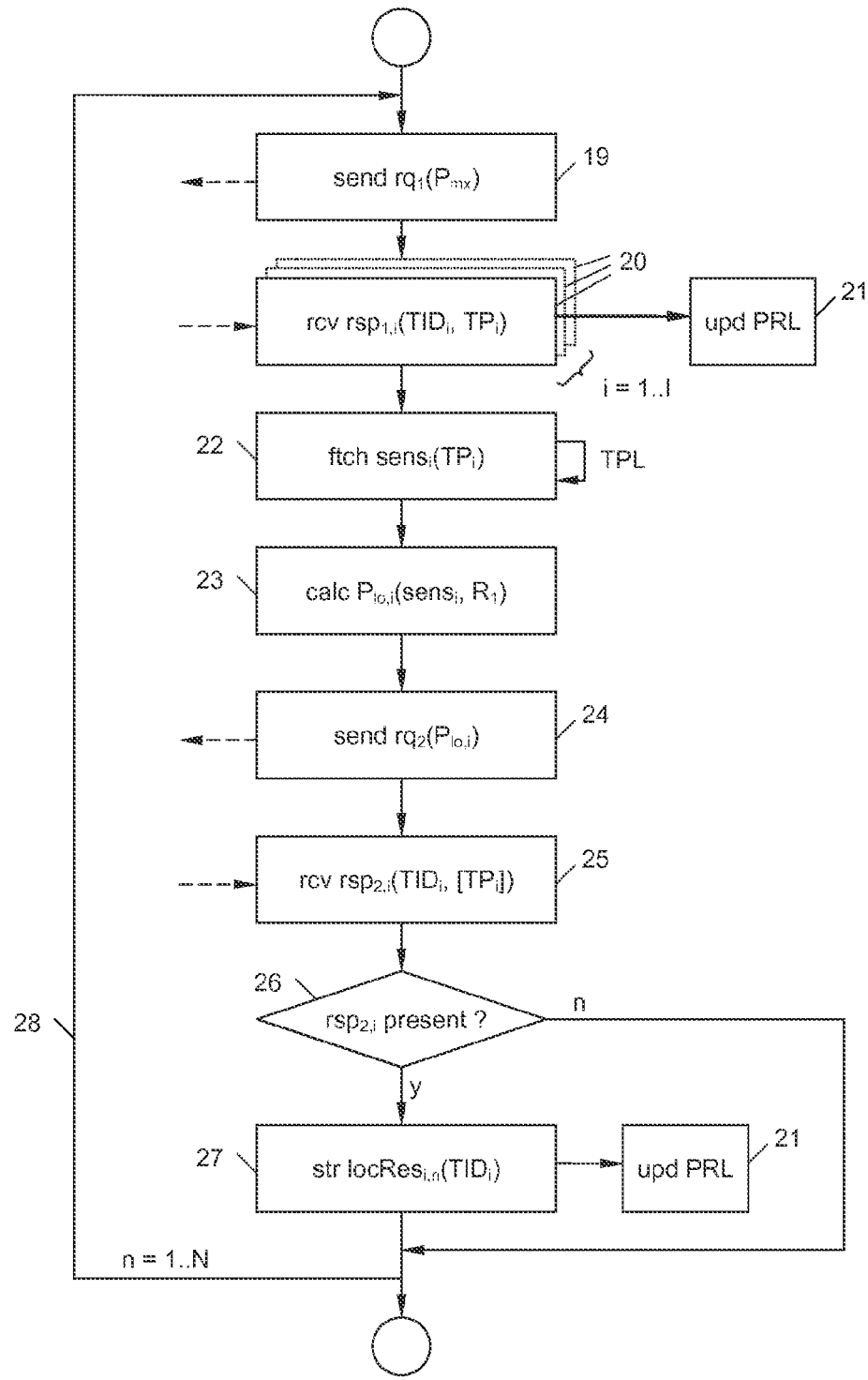
FIGS. 5a and 5b show two different embodiments in the form of a flow diagram in each case.
Figure 6A:
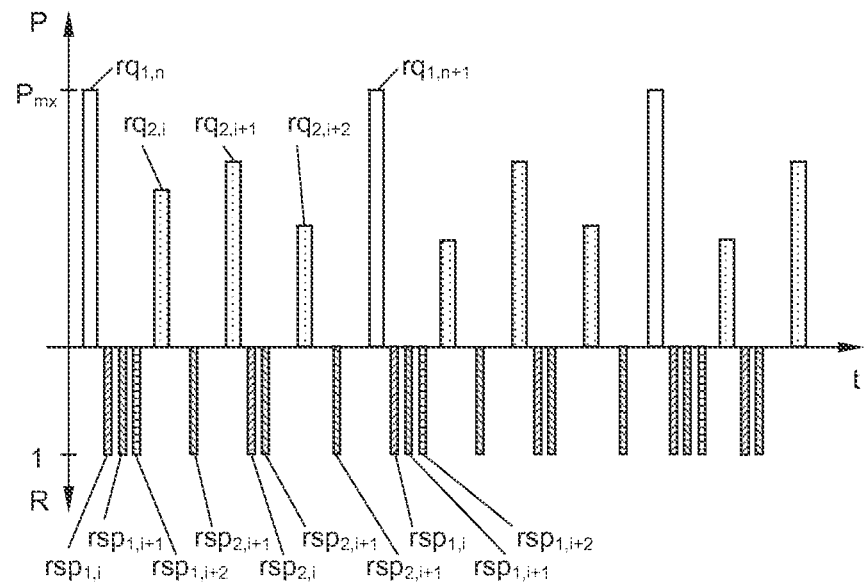
FIGS. 6a and 6b show time graphs of data packets or signals that occur within the scope of the method of FIGS. 5a and 5b.

In accordance with FIGS. 5a and 6a, the radio beacon 5 in a first step 19 sends a first request $rq_1$ with a first (maximum) transmission power $P_{mx}$, which is at least so large that OBUs $8_i$ which are located within the desired localisation area 6 at the furthest distance from the radio beacon 5 and which have a radio transceiver $12_i$ having the lowest reception sensitivity $sens_i$ of all possible reception sensitivities $sens_k$ of possible OBU types $TP_k$, that is to say that "hear the worst", also receive and can process the first request $rq_1(P_{mx})$. Thus, it may be that, for example, even an OBU $8_{i+1}$ that "hears particularly well" in an adjacent lane 3 or 3" (as shown to the right in FIG. 1) receives and responds to such a first request $rq_1$, as will be explained hereinafter.

In a next step 20, a first response $rsp_{1,i}$ is then received by any OBUs $8_i$ located currently in the radio coverage area 6. The response $rsp_{1,i}$ of each OBU $8_i$ contains at least the type identifier $TP_i$ of the OBU $8_i$ and may also contain the OBU identifier $TID_i$ of the OBU $8_i$.

The aforementioned embodiment of the method, in which the OBU identifiers $TID_i$ are also received and processed, is able to localise a number of OBUs $8_i$ located simultaneously in the radio coverage area 6 of the radio beacon 5; in this case, the presence list PRL in the memory 18 is also updated in a step 21 with each receipt of a first response $rsp_{1,i}$, that is to say the OBU identifiers $TID_i$ of the present OBUs $8_i$ are recorded there (FIGS. 4a, 4b) so as to be able to carry out the further localisation method for all OBUs $8_i$ present, as will be explained later. In the simplest case, when the method is suitable for just one OBU $8_i$ in the radio coverage area 6 and no further evaluations are necessary, the receipt of the OBU identifier $TID_i$ is unnecessary, and the management of a presence list PRL in step 21 is omitted.

In a next step 22, a radio property of the transceiver $12_i$ of the respective OBU $8_i$ associated with the (or each) type identifier $TP_i$ just received is then determined from the database 17, more specifically from the type list TPL. In the method example of FIG. 5a, this radio property is the reception sensitivity $sens_i$ of the transceiver $12_i$. To this end, a corresponding type list TPL containing possible type identifiers $TP_k$ of OBUs and their associated reception sensitivities $sens_k$ was stored in the database 17 (FIG. 3a) in an earlier step (not shown in FIG. 5a). The reception sensitivities $sens_k$ can be determined for example by a one-time calibration of an OBU of the respective type $TP_k$, for example when this type comes onto the market or appears in the system for the first time.

The reception sensitivity $sens_k$, for example, is a measure that specifies the power with which a signal, such as a request $rq_1$ from the radio beacon 5, has to be received in the on-board unit 2 in order to be able to be processed thereby.

In a step 23, a ("second") transmission power $P_{lo,i}$ individual for an OBU $8_i$ is then calculated from the reception sensitivity $sens_i$ of this OBU $8_i$ thus determined and is sufficient for covering precisely the radio coverage area 6 of size $R_1$ of interest for the localisation and does not go therebeyond, that is to say $P_{lo,i}=f(sens_i, R_1)$.

The second transmission power $P_{lo,i}$ calculated individually for the OBU $8_i$ is then used for a renewed ("second") request $rq_2$ addressed to the same OBU $8_i$ in a step 24. If a ("second") response $rsp_{2,i}$ to this second request $rq_2$ ($P_{lo,i}$) is received again from the same OBU $8_i$ in a step 25 (branch "y" of the branching 26), this means that the $OBU_i$ is located in the desired localisation area, for example in the lane 3' in this case. This may also be stored in an (optional) step 27 as a first (n=1) successful localisation result $locRes_{i,n}$ of the OBU $8_i$ under the OBU identifier $TID_i$ thereof in the presence list PRL (FIG. 4a). The localisation result $locRes_{i,n}$ can be stored for example as a binary value, for example "1" for a successful ("positive") localisation (branch "y" of the comparison 26) or "0" for an unsuccessful ("negative") localisation or "non-localisation" (branch "n" of the comparison 26).

When the method is suitable for a number of OBUs $8_i$ in the radio coverage area 6 and the first response $rsp_{1,i}$ contains the OBU identifier $TID_i$, the second request $rq_2(P_{lo,i})$ can be addressed in step 24 to the respective OBU identifier $TID_i$ ($rq_{2,i}$), that is to say I second requests $rq_2$ can be sent in step 24. Alternatively, the second responses $rsp_{2,i}$ with OBU identifiers $TID_i$ received in response to an unspecific (unaddressed) second request $rq_2$ in step 25 can be checked against the OBU identifier $TID_i$ of the first responses $rsp_{1,i}$ in order to achieve an assignment of the first and second responses $rsp_{1,i}$ and $rsp_{2,i}$ for an OBU $8_i$.

If desired, N cycles of the localisation method for an OBU $8_i$ can be repeated in a loop 28 in order to obtain a number of localisation results $locRes_{i,n}$ (n=1 ... N) per OBU $8_i$, which for example can be stored in the presence list PRL for the respective OBU identifier $TID_i$. If, for example, the ratio of the number of successful localisation results $locRes_{i,n}$ of an OBU $8_i$, that is to say the number of successful (positive) radio communications, to the number N of performed repetitions, that is to say total radio communications, exceeds a threshold value ("voting threshold"), the localisation of this OBU $8_i$ can be considered to be verified or validated. The calculation of this ratio or the determination of the threshold value can be adapted here also to the type identifier $TP_i$, whereby, for example, qualitatively "poorer" OBUs can be assigned a different threshold value than OBUs of "higher" quality. In any case, the threshold value may be both absolute, for example a predefined minimum number of positive localisation results ("y"), or relative, for example a predefined percentage of positive localisation results ("y") of all localisations results ("y" and "n").

Figure 5B:
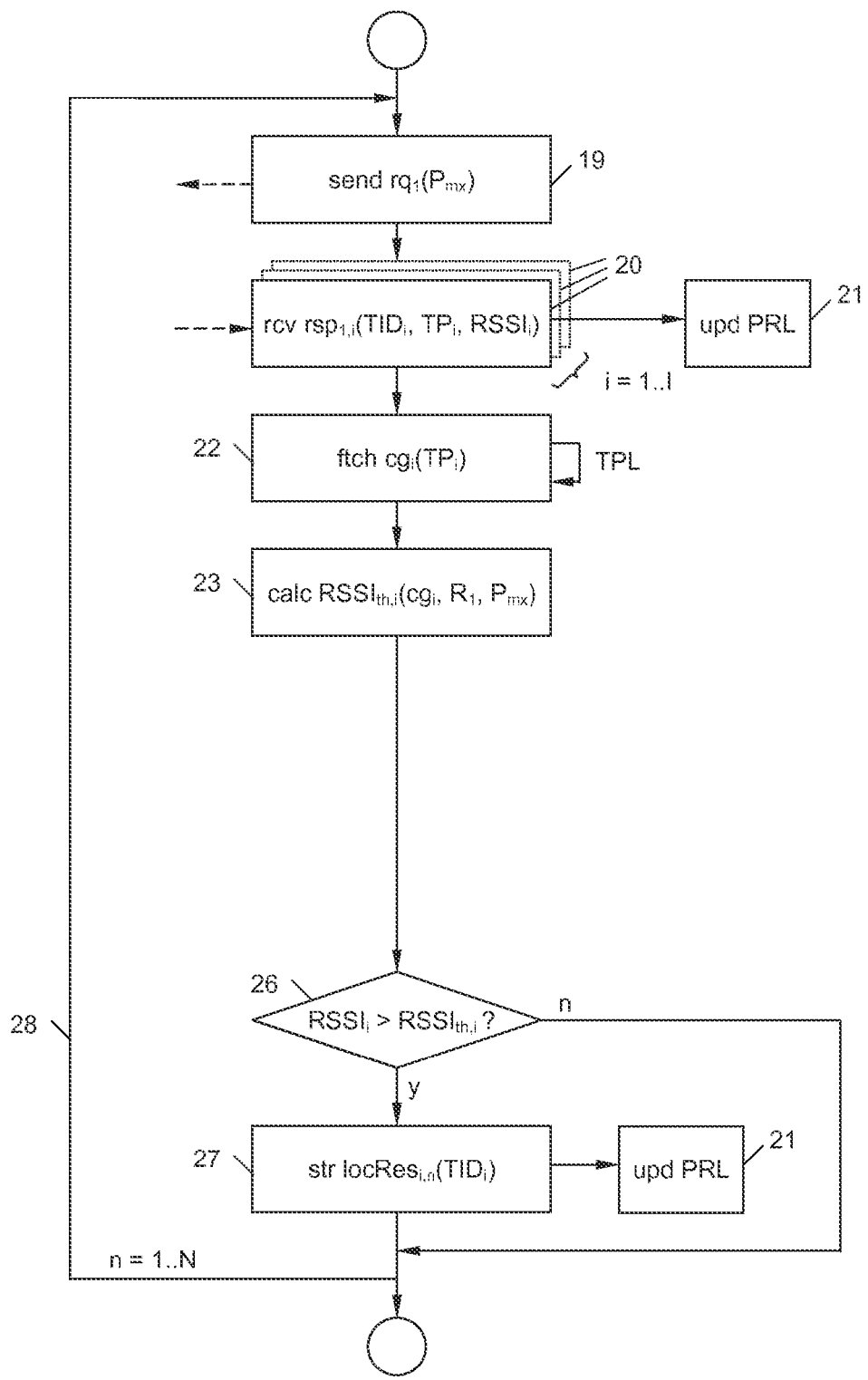
Figure 6B:
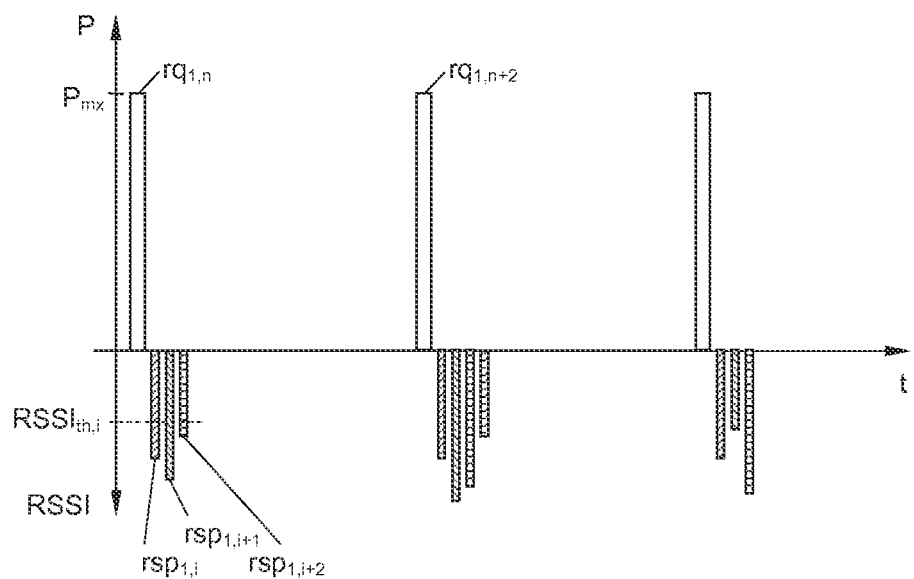

A second embodiment of the explained method will now be described with reference to FIGS. 5b and 6b with reference to the list variances of FIGS. 3b and 4b, wherein, for simplification, only the differences from the first embodiment will be discussed. In accordance with FIG. 5b, when the first responses $rsp_{1,i}$ are received in step 20, the received signal strength $RSSI_i$ of the respective response $rsp_{1,i}$ is also measured in the radio beacon 5. The received signal strength $RSSI_i$ can be stored for example in the presence list PRL for further processing (FIG. 4b).

In step 22, a conversion gain $cg_i$ is then determined from the database 17, more specifically the type list TPL, as a radio property of the OBU $8_i$ associated with the received type identifier $TP_i$. The conversion gain $cg_i$, for example, is a measure that specifies the absolute transmission power at which a response $rsp_{1,i}$ is sent from the radio transceiver $12_i$ of an OBU $8_i$ of the active type or the relative proportion of (previously received) transmission power that a radio transceiver $12_i$ of an OBU $8_i$ of the passive type can reflect as a response $rsp_{1,i}$ to an incoming request $rq_1$. The conversion gain $cg_k$ of all possible type identifiers $TP_k$ of OBUs $8_k$ can be determined for example in an earlier step (not shown in FIG. 5b) by a one-time calibration of an OBU of the respective type $TP_k$, for example when this type comes onto the market or appears in the system for the first time, and can be stored in the type list TP of the database 17.

An individual threshold value $RSSI_{th,i}$ for the received signal strength $RSSI_i$, measured in step 20, of the OBU response $rsp_{1,i}$ can be calculated from the conversion gain $cg_i$, the size $R_1$ of the area to be localised (here the size of a lane 3, 3', 3") and the transmission power $P_{mx}$ of the first request $rq_1(P_{mx})$ to give $RSSI_{th,i}=f(cg_i, R_1, P_{mx})$. If the measured received strength $RSSI_i$ of the respective response $rsp_{1,i}$ is above the determined threshold value $RSSI_{th,i}$ (branch "y" of the comparison 26), the OBU $8_i$ is then localised and the localisation result $locRes_{i,n}$ can now be re-established and optionally stored (step 27). The loop 28 for a number of cycles N can optionally be run through again, as described previously for FIG. 5a. The localisation result $locRes_{i,n}$ can be stored again, for example as a binary value, for example "1" for a successful (positive) localisation (branch "y" of the comparison 26) or "0" for an unsuccessful (negative) localisation or non-localisation (branch "n" of the comparison 26). However, it is also possible to store, as a localisation result $locRes_{i,n}$, a quantitative measure for the localisation, for example the measured received signal strength $RSSI_i$ of the respective first response $rsp_{1,i}$ of the OBU $8_i$.

CONCLUSION

The invention is not limited to the presented embodiments, but also includes variants, modifications and combinations thereof that fall within the scope of the accompanying claims. By way of example, radio properties other than said reception sensitivity $sens_k$ and conversion gain $cg_k$ of OBUs $8_k$ can also be stored in the database 17 in further embodiments and can be used for the localisation of an OBU $8_i$ to the desired area 6.

What is claimed is:

1. A method for localising an on-board unit, which has a radio transceiver and an identifier, to a predefined area around a radio beacon, comprising the following steps:
   a) storing the identifier of the on-board unit and an associated radio property of the radio transceiver thereof in a database;
   b) sending a first request with a first transmission power from the radio beacon;
   c) receiving, in the radio beacon, a first response, which contains the identifier and a unique OBU identifier, from an on-board unit, and storing the OBU identifier in a presence list;
   d) determining, from the database, the radio property of the transceiver of the on-board unit associated with the received identifier; and
   e) localising the on-board unit in the predefined area by using the determined radio property; wherein:
   the steps b) to e) are repeated for at least one further run-through following a first run-through,
   for each run-through of the steps b) to e) concerning a respective OBU identifier, a localisation result is stored in the presence list for the respective OBU identifier, and
   the localising of the on-board unit of the respective OBU identifier is verified when the number of positive localisation results stored for the respective OBU identifier exceeds a threshold value.

2. The method according to claim 1, wherein the localising of step e) comprises:
   calculating a second transmission power in accordance with the determined radio property and the predefined area,
   sending a second request with the calculated second transmission power from the radio beacon,
   and, when a second response to the second request is received from the same on-board unit, localising the on-board unit as being situated in the predefined area.

3. The method according to claim 2, wherein said radio property is a transmission sensitivity of the radio transceiver of the on-board unit.

4. The method according to claim 1, wherein the localising of step e) comprises:
   calculating a threshold value for a received signal strength in accordance with the determined radio property, the first transmission power and the predefined area,
   comparing the measured received signal strength of the first response with the calculated threshold value,
   and, if the threshold value is exceeded, localising the on-board unit as being situated in the predefined area.

5. The method according to claim 4, wherein said radio property is a measure for a conversion gain of the radio transceiver of the on-board unit.

6. The method according to claim 1, wherein the aforementioned identifier is a type identifier of the radio transceiver.

7. The method according to claim 1, wherein, when multiple first responses are received to a first request, all OBU identifiers contained in these responses are stored in the presence list, and
   wherein steps d) and e) are carried out for each OBU identifier stored in the presence list.

8. The method according to claim 2, wherein, when multiple first responses are received to a first request, all OBU identifiers contained in these responses are stored in the presence list,
   wherein steps d) and e) are carried out for each OBU identifier stored in the presence list, and
   wherein each of the second requests is addressed to one of the OBU identifiers stored in the presence list.

9. A radio beacon for localising an on-board unit, which has a radio transceiver and an identifier, to a predefined area around the radio beacon, comprising:
   a memory;
   a radio transceiver; and
   a processor connected to the memory and to the radio transceiver;
   wherein the processor is configured
   a) to store the identifier of the on-board unit and an associated radio property of the radio transceiver in the memory,
   b) to send a first request with a first transmission power via the radio transceiver,
   c) to receive, from an on-board unit, a first response, which contains the identifier and a unique OBU identifier, via the radio transceiver, and to store the OBU identifier in the presence list,
   d) to determine, from the memory, the radio property of the transceiver of the on-board unit associated with the received identifier, and
   e) to localise the on-board unit in the predefined area by using the determined radio property, and
   wherein the processor is further configured to
   repeat the steps b) to e) for at least one further run-through following a first run-through,
   to store a localisation result in the presence list for a respective OBU identifier for each run-through of the steps b) to e) concerning the respective OBU identifier, and
   to verify the localising of the on-board unit of the respective OBU identifier when the number of positive localisation results stored for the respective OBU identifier exceeds a threshold value.

10. The radio beacon according to claim 9, wherein
   said radio property is a measure for a transmission sensitivity of the radio transceiver of the on-board unit, and
   wherein the processor is configured, in the case of said localising,
      to calculate a second transmission power in accordance with the determined radio property and the predefined area,
      to send a second request with the calculated second transmission power via the radio transceiver, and, when a second response to the second request is received from the same on-board unit, to localise the on-board unit as being situated in the predefined area.

11. The radio beacon according to claim 9, wherein said radio property is a measure for a conversion gain of the radio transceiver of the on-board unit, and wherein the processor is configured, in the case of said localising, to calculate a threshold value for a received signal strength in accordance with the determined radio property, the first transmission power and the predefined area, to compare the measured received signal strength of the first response with the calculated threshold value, and, if the threshold value is exceeded, to localise the on-board unit as being situated in the predefined area.

12. The radio beacon according to claim 9, wherein said identifier is a type identifier of the radio transceiver.

* * * * *